July 16, 1957 J. G. RAY ET AL 2,799,753
MERCURY SWITCHING DEVICE
Filed Sept. 29, 1955
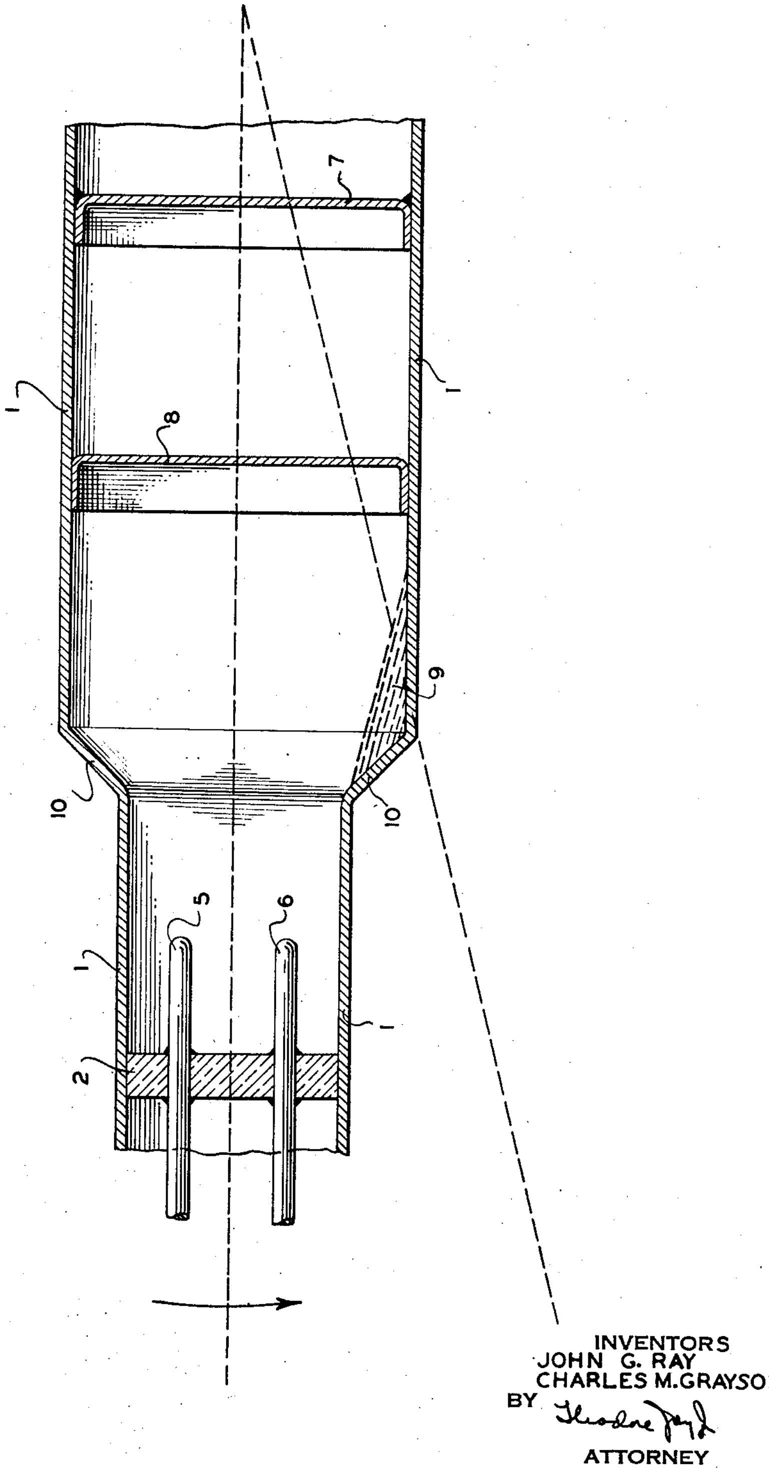
INVENTORS
JOHN G. RAY
CHARLES M. GRAYSON
BY Theodore Jay Jr.
ATTORNEY

United States Patent Office 2,799,753

Patented July 16, 1957

2,799,753

MERCURY SWITCHING DEVICE

John G. Ray, Huntington Station, and Charles M. Grayson, East Meadow, N. Y., assignors to Sylvania Electric Products Inc., a corporation of Massachusetts Application September 29, 1955, Serial No. 537,462

9 Claims. (Cl. 200—152)

Our invention is directed toward mercury switching devices.

Devices of this kind are normally used to close or open an electric circuit as the device is moved or rotated. Conventionally, the device contains a pool of mercury confined within a glass enclosure. Two or more electrical contact elements extend within the enclosure, or alternatively one element extends within and insulated from the enclosure, and the enclosure itself acts as the second element. When the device is rotated or moved to a first selected position, the mercury flows into contact with both elements or with one element and the enclosure thus establishing an electrical connection therebetween. When the device is rotated or moved to a second selected position, the mercury flows away from one or both elements, and there is no electrical connection between the elements.

Glass enclosures have poor resistance to thermal and mechanical stress; the external and internal dimensions of the enclosure cannot be held within very close tolerances; and the external dimensions must be relatively large as compared to enclosures formed from metal. The above limitations can be overcome through the use of a metallic enclosure. However, in order to prevent leaks and to keep the mercury out of contact with air, the enclosure must be hermetically sealed. The sealing operation as, for example, welding is in general carried out at elevated temperatures. Metals or alloys when heated to such temperatures will react with mercury, in such manner so as to cause surface wetting of the mercury to metallic parts, which in turn causes erratic mercury flow and unreliable switch performance.

We have invented a mercury switching device in which these difficulties are obviated and in which a metallic enclosure is used.

Accordingly, it is an object of the present invention to improve mercury switching devices through the use of metallic enclosures which do not react chemically with the mercury contained therein.

Another object is to provide a new and improved mercury switching device characterized by the use of a metallic enclosure containing mercury.

Still another object is to provide a new and improved mercury switching device characterized by a hermetically sealed metallic enclosure having closely controlled dimensional tolerances, and having a second section which contains no mercury and a first section which contains mercury.

These and other objects of our invention will either be explained or will become apparent hereinafter.

A mercury switching device in accordance with our invention includes a hollow casing open at one end and having one or more insulatedly separated electrical contact elements projecting inward to said casing and hermetically sealed thereto. The open end of the casing is covered by a first metallic member which is hermetically sealed to said casing. A second metallic member is positioned within and secured to said casing at a point intermediate the first member and the elements. The mercury is contained within a first portion of the casing subtended by the second member and the elements; no mercury can flow between the portion and a second portion of the casing subtended by the first and second members.

The device is assembled in such manner that the first member is hermetically sealed to the casing, for example, by welding, after the second member has been placed in position within the casing. Thus, no mercury can come in contact with the first member during the sealing operation. The second member being physically displaced from the first member, will not be appreciably heated during the sealing operation. Consequently, when the second member is formed from metals or alloys which will not react with mercury under normal operating temperatures, the entire device cannot be subjected to surface wetting of the mercury to metallic parts.

The second member can be formed either from metals or alloys which are inherently non-reactive (thermally passive) with respect to mercury at the temperatures indicated or alternatively can be formed from metals or alloys which have been chemically treated to be chemically passive with respect to mercury at these temperatures.

An illustrative embodiment of our invention will now be explained with reference to the accompanying figure.

There is provided a hollow casing 1 formed for example of steel or other metal passive to mercury and open at both ends. One end of the casing is hermetically sealed to glass, through which electrical conductors 5 and 6 extend into the casing. These conductors in turn are hermetically sealed to the insulator.

A first metal member as, for example, a cap 7 is positioned within and is hermetically sealed to the other end of the casing. Interposed between the cap 7 and the insulator 2 is a second metal member, for example, a cap 8 which is secured, for example, by pressure fitting to the inner walls of casing 1.

The casing itself has a general cylindrical cross section. The casing in the region adjacent the end containing cap 7 has a diameter which is larger than that of the casing region adjacent the other end. A section of the casing identified at 10 has a tapering circular cross section; this section is used to form a dam for the mercury when the end of the casing, remote from cap 7 is swung downward while the other end is held in place. A mercury pool 9 is contained between section 10 and the cap 8 when the device is in the position indicated. Under these conditions, conductors 5 and 6 are electrically isolated from each other.

When the end of the casing remote from cap 7 is swung downward while the other end is held in place, the mercury collects at casing section 10 and, when sufficient lowering of casing has occurred, flows downward and into contact with both conductors to establish an electrical connection between both conductors. The purpose of the dam is to promote more sudden release of the mercury globule, which in turn results in more positive contact action, for a predetermined angular range.

It will be apparent that the above described invention can be modified by removing one electrical conductor and using the casing itself in place of the removed conductor.

While we have shown and pointed out our invention as applied above, it will be apparent to those skilled in the art that many modifications can be made within the scope and sphere of our invention as defined in the claims which follow.

What is claimed is:

1. A mercury switching device comprising a hollow metallic casing open at one end; a first metallic solid member hermetically sealed to and closing said open end; and a second metallic solid member positioned within and secured to said casing, the volume within said casing subtended by said members being characterized by the absence of liquid mercury.

2. The device as set forth in claim 1 further including at least two insulated and physically separated electrical contact elements projecting inwardly into said casing at a point remote from both members.

3. A mercury switching device comprising a hollow metallic casing having opposed ends, one end being sealed, the other end being open; a first metallic member secured to and sealing off said open end; a second metallic member positioned within said casing and secured to the inner walls thereof at a position intermediate said ends to divide said casing into a first portion subtended by said second member and said one end and a second portion subtended by both of said members, said first portion containing mercury, said second portion being free from mercury, said second member preventing mercury from flowing out of said first portion into said second portion.

4. The device as set forth in claim 3 further comprising at least two physically separated electrical contact elements projecting inwardly into said casing at said one end, said elements being insulatedly separated from said casing.

5. The device as set forth in claim 4 wherein said casing is generally cylindrical in shape, said device including means to vertically pivot said casing about the said other end whereby when said one end is vertically positioned below said other end the mercury in said first portion contacts both of said elements and when both ends are in horizontal registration, the mercury is physically displaced from said elements.

6. The method for producing a mercury switching device characterized by the presence of a metallic casing or enclosure which contains said mercury, said casing having opposed ends, one end being sealed, the other end being open, which comprises the steps of inserting a small amount of mercury into said casing through said open end; rigidly positioning a metallic member within said casing at a point intermediate said mercury and said open end; and hermetically sealing another metallic member to said open end to close same.

7. The method as set forth in claim 6 wherein said sealing operation is carried out at elevated temperatures, said another member and said mercury having metallurgical properties at which said another member is passive with respect to mercury during said sealing operation.

8. The device as set forth in claim 1 further including at least one electrical contact element projecting inwardly into said casing at a point remote from both members, said element being insulated from said casing.

9. The device as set forth in claim 3 further comprising at least one electrical contact element projecting inwardly into said casing at said one end, said element being insulatedly separated from said casing.

References Cited in the file of this patent

UNITED STATES PATENTS 972,516 De Wolf -------------- Oct. 11, 1910